United States Patent [19]

Ban et al.

[11] 4,227,107
[45] Oct. 7, 1980

[54] DIRECT CURRENT MOTOR WITH DOUBLE LAYER ARMATURE WINDINGS

[76] Inventors: Itsuki Ban, 829, Higashi-Oizumimachi, Nerima-ku, Tokyo; Manabu Shiraki, 4451-171, Shimotsuruma, Yamato-shi, Kanagawa-ken; Kazuhito Egami, 2-44-1, Chuo, Nakano-ku, Tokyo, all of Japan

[21] Appl. No.: 929,565

[22] Filed: Jul. 31, 1978

[30] Foreign Application Priority Data

Dec. 5, 1977 [JP] Japan .................................. 52/145179

[51] Int. Cl.$^3$ .......................... H02K 3/00; H02K 23/26
[52] U.S. Cl. ...................................... 310/198; 310/46; 310/206; 310/207; 310/234
[58] Field of Search ................... 310/46, 177, 180, 181, 310/184, 198, 202, 206, 207, 136, 137, 138, 140, 139, 141, 142, 129, 130, 173, 231, 233, 234; 318/138, 439; 322/90

[56] References Cited

U.S. PATENT DOCUMENTS

| | | | |
|---|---|---|---|
| 3,126,618 | 3/1964 | Sharrow | 310/234 |
| 3,183,386 | 5/1965 | Miller | 310/141 |
| 3,535,573 | 10/1970 | Appleton | 310/234 |
| 3,705,459 | 12/1972 | Biddison | 310/234 |
| 3,733,506 | 5/1973 | Jaffe | 310/198 |
| 4,107,587 | 8/1978 | Ban | 310/202 |

FOREIGN PATENT DOCUMENTS 744563 11/1943 Fed. Rep. of Germany .......... 310/136

*Primary Examiner*—R. Skudy
*Attorney, Agent, or Firm*—Kenway & Jenney

[57] ABSTRACT

A direct current motor, having armature windings superposed on each other in double layers, is provided with a fixed field magnet having 2 mn poles (m being a positive integer of 1 or more, n a positive integer of 2 or more) magnetized alternately to N and S polarities in equal angular spaces, a magnetic material member for closing the magnetic path of the field magnet, rotating shaft supported by bearings provided in the housing of the motor, and an armature secured to the shaft for rotation in the magnetic path facing to the field magnet poles. A first series of m(2n−1) armature windings mounted on the armature are juxtaposed side by side at equal pitches, the angular spacing between the conductor portions of the windings, which contribute to generate torque, being equal to the angular width of the field magnet pole. A second series of m(2n−1) armature windings mounted on the armature are juxtaposed side by side at equal pitches, the angular spacing between the conductor portions of the windings of the second series, which contribute to generate torque, being equal to the angular width of the field magnet pole. The first series of armature windings and the second series of armature windings are superposed on each other and are disposed, with respect to each other, out of phase by 1/(2n−1) of the angular width of the field magnet pole.

2 Claims, 10 Drawing Figures

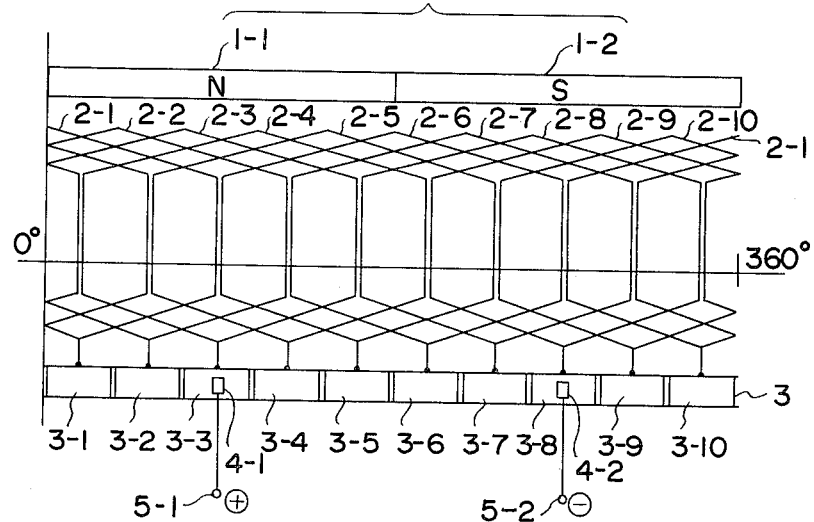
PRIOR ART FIG.3
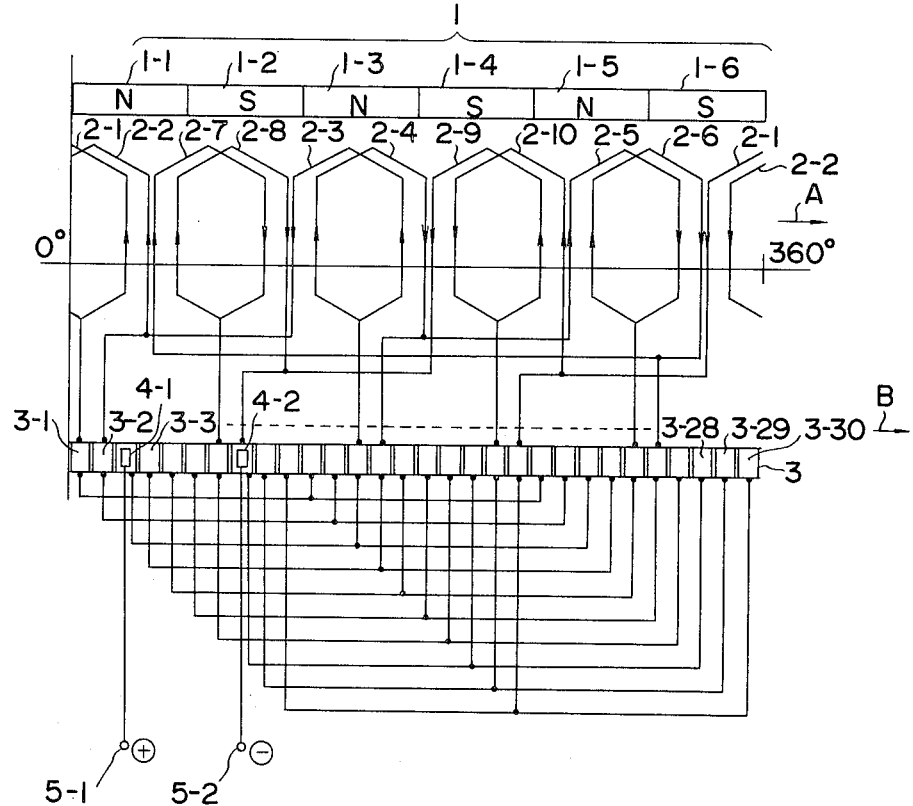
FIG.4

DIRECT CURRENT MOTOR WITH DOUBLE LAYER ARMATURE WINDINGS

BACKGROUND OF THE INVENTION

This invention relates to a direct current motor having a wound armature provided with a plurality of insulated windings.

It is well known that a direct current (DC) motor, provided with a plurality of armature windings formed in a lap winding manner or a wave winding manner, is highly efficient and has better commutating characteristics as the number of armature windings increases. However, if the conventional manner of lap winding or wave winding is employed in a coreless motor, the armature will increase in thickness because the armature windings are superposed on each other in many layers. The increased thickness of the armature will substantially reduce the effective magnetic field of the field magnet which passes through the armature resulting in decreased motor efficiency and starting torque. In order to solve these problems, the prior art effort has been directed to reduce the thickness of the conductor portions, which contribute to generate torque, by specially processing the edge portions of the coils. This processing for reducing the thickness of conductor portions was performed by press molding, and accordingly was often accompanied by such defects as breaking and short-circuiting of the armature windings. Further, since the phase relationship between the armature windings could not be positively held in a desired state at the time the windings were arranged, correct phase relationship between the windings was liable to be distorted. It was, therefore, very difficult to obtain a DC motor having an efficiency as high as theoretically expected. Accordingly, such prior art DC motors were costly and could not be mass produced. Another prior art technique used for conventional cylindrical coreless DC motors, for avoiding superposition of the edge portions of coils of armature windings on each other required that insulated wire be wound in alignment, turn by turn, so that the entire width of winding, or a part thereof, may slant with respect to the rotating axis. This technique, however, also cannot be used for mass-production and is costly.

SUMMARY OF THE INVENTION

The above-described drawbacks in prior art DC motors have been successfully eliminated by the present invention.

Accordingly, an object of the invention is to provide a DC motor which is capable of mass production at reduced cost.

Another object of the invention is to provide a DC motor which has high torque and efficiency, wherein the conventional lap windings or wave windings are arranged in a manner that, for 2n (n being a positive integer of 2 or more) of the number of field magnet poles, a first series of (2n−1) armature windings and a second series of (2n−1) armature windings are arranged by a method, which will be described hereinbelow, so that the armature windings are superposed on each other in only two layers, thus providing a thinner armature without any special processing.

A further object of the invention is to provide a DC motor which has armature windings superposed on each other in only two layers and wherein voltage applied between commutator segments is equal to that in a motor having lap or wave armature windings, generation of sparks between the commutator bars is reduced, short-circuit accidents can be prevented, and increased durability of the motor is achieved.

A still further object of the invention is to provide a DC motor wherein better commutating characteristics can be obtained as the number of commutator segments increases.

A still further object of the invention is to provide a DC motor wherein the armature windings can easily be positioned in an ideal arrangement whereby undesirable out-of-phase between the armature windings can be completely prevented.

According to the invention, there is provided a DC motor which has armature windings superposed on each other in two layers. The DC motor is provided with a fixed field magnet having 2mn poles (m being a positive integer of 1 or more, and n being a positive integer of 2 or more) which are magnetized alternately to N- and S-polarities in equal angular spaces. The DC motor further includes a magnetic material member for closing the magnetic path of the field magnet, a rotating shaft supported by bearings provided in the housing of the motor, and an armature fixed to the rotating shaft for rotation in the magnetic path and facing the poles of field magnet. The armature includes a first series of m(2n−1) armature windings which are mounted on the armature so that the angular spacing between the conductor portions, which contribute to generate torque, of the windings is equal to the angular width of the field magnet pole and so that the windings are juxtaposed at equal pitches. The armature further includes a second series of m(2n−1) armature windings which are also mounted on the armature so that the angular spacing between the conductor portions, which contribute to generate torque, of the windings is equal to the angular width of the field magnet pole and so that the windings are juxtaposed at equal pitches. The first series of m(2n−1) armature windings and the second series of m(2n−1) armature windings are superposed on each other with a phase shift, with respect to each other, of 1/(2n−1) of the angular width of the field magnet pole.

The above and other objects and advantages of the invention will be apparent from the following description of the preferred embodiments taken in conjunction with the accompanying drawings.

BRIEF DESCRIPTION OF THE DRAWINGS

FIG. 3 is a developed view of a prior art DC motor having ten lap armature windings;

FIG. 4 is a developed view of another embodiment of the DC motor of the invention;

FIG. 5b is a cross-sectional view of the cylindrical armature of FIG. 5a;

FIG. 7b is a cross-sectional view of the cylindrical armature of FIG. 7a; and

DETAILED DESCRIPTION OF THE PREFERRED EMBODIMENTS

For the purpose of understanding of the above-described features of the invention, the embodiments of commutator motors which employ a specifically constructed cylindrical coreless armature will now be described. The DC motor of the invention is essentially provided with a fixed field magnet, a magnetic material member for closing the magnetic path of the field magnet, a rotating shaft supported by bearings provided in the housing of motor (usually, this housing and the above-mentioned magnetic material member may be one and the same member), and an armature which is fixed to the shaft for rotation in the magnetic path and facing the poles of the field magnet. Although the embodiment will be described with respect to lap windings, wave windings may be employed in place of the lap windings to achieve the same objects.

Figure 1:
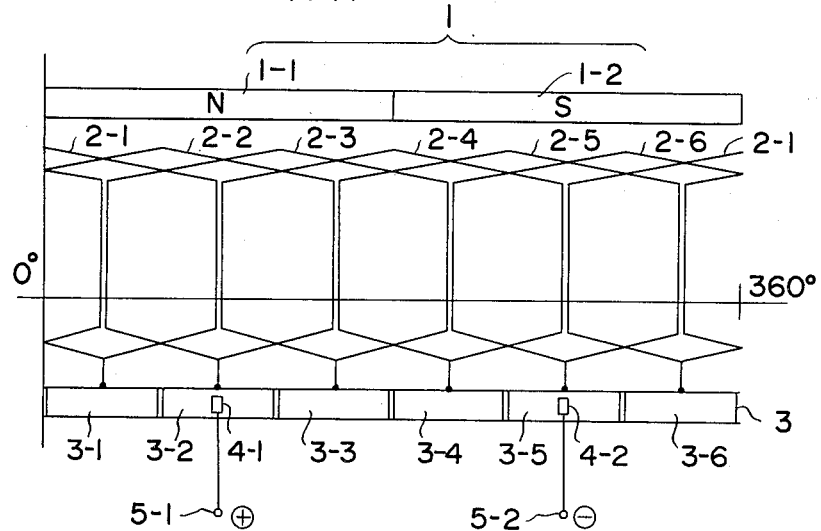
FIG. 1 is a developed view of a prior art DC motor having six lap armature windings.

FIG. 1 is a development of a conventional DC motor which has two field magnet poles and is provided with six lap armature windings shifted in phase from each other. In FIG. 1, the numerals 1-1 and 1-2 indicate the field magnet poles which are angularly spaced at 180° and magnetized to N and S polarity, respectively. There are also provided armature windings 2-1, 2-2, ..., 2-6 which are shifted in phase by 60° from each other. As is noted from the figure, when the conventional winding technique is employed, these armature windings must be mounted on the armature in superposition of six layers. Accordingly, substantial labor is required for processing the edge portions of the coils, which constitutes an obstacle to mass production. On the other hand, if the six windings are molded and solidified into a unit and mounted on the armature, the resultant armature assembly will be of increased thickness because the windings are superposed on each other in six layers. Such increased thickness will substantially reduce the effective magnetic field of the field magnet which passes through the armature resulting in decreased efficiency and decreased starting torque. The angular space of each of the armature windings 2-1, 2-2, ..., 2-6 is 180° which is equal to the angular width of the field magnet poles 1-1, 1-2. A commutator 3 consists of commutator segments 3-1, 3-2, ..., 3-6, each having an angular space of 60° (⅓ of the angular width of the field magnet pole). The numerals 4-1 and 4-2 indicate brushes which are adapted to receive current respectively from the positive and negative terminals, 5-1 and 5-2, of a DC supply source. The brushes 4-1 and 4-2 are angularly spaced from each other by 180° which is equal to the angular width of the field magnet pole.

Figure 2:
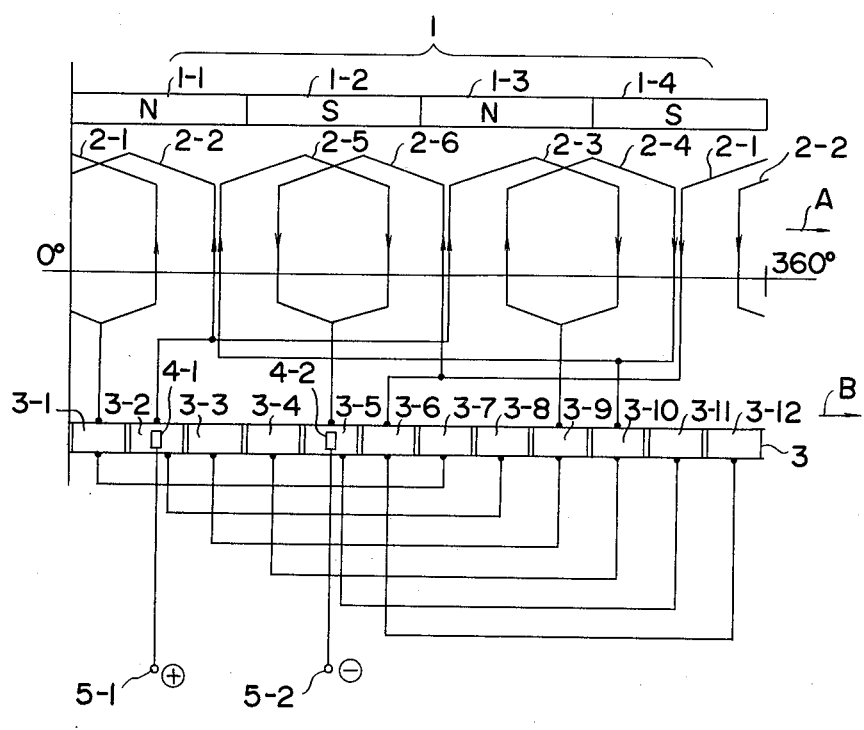
FIG. 2 is a developed view of an embodiment of the DC motor according to the invention.

An embodiment of DC motor of the invention will now be described in conjunction with the development of FIG. 2. In FIG. 2, the numerals 1-1, 1-2, 1-3 and 1-4 indicate respectively field magnet poles which are arranged at 90° angular spacings and, magnetized alternately to N and S polarity. In the conventional lap winding shown in FIG. 1, under the poles 1-1 and 1-2, which are alternately magnetized at 180° angular spacings, all the armature windings 2-1, 2-2, ..., 2-6 are disposed with an angular spacing which equals the angular width of the field magnet pole and, accordingly, the armature windings are superposed in multiple layers. However, if four field magnet poles, each being of 90° angular space, are employed, and the armature windings 2-3 and 2-4 are shifted rightward by 180° from those shown in FIG. 1 so that they are under the field magnet poles of the same polarity as shown in FIG. 2, no change in the direction of output torque will occur. Accordingly, the DC motor so constructed will rotate in the same manner as a conventional lap winding motor. In this case, of course, the armature windings which would otherwise be located under the field magnet poles 1-3, 1-4 are omitted. In FIG. 2, the angular spacing between the conductor portions of each of the armature windings 2-1, 2-2, ..., 2-6, which contribute to generate torque, is 90° which equals the angular width of the field magnet pole. A first series of the armature windings 2-1, 2-5, 2-3 are juxtaposed side by side at equal pitches of 120°. Similarly, a second series of the armature windings 2-2, 2-6, 2-4 are juxtaposed side by side at equal pitches of 120°. The armature windings 2-1, 2-5, 2-3 are located with 30° phase shift with respect to the armature windings 2-2, 2-6, 2-4 and are superposed on the latter armature windings. The order of interconnections of the armature windings shown in FIG. 2 is the same as that in FIG. 1. That is, they are interconnected in the order of 2-1, 2-2 ..., 2-6, the termination end of a preceeding winding being connected to the start end of the succeeding winding, and the respective interconnection junctures being connected to corresponding commutator segments, as shown in FIG. 2.

A commutator 3 consists of commutator 3-1, 3-2, ..., 3-12, each having a 30° angular space (⅓ of the angular width of the field magnet pole). The segments 3-1 and 3-7, segments 3-2 and 3-8, segments 3-3 and 3-9, segments 3-4 and 3-10, segments 3-5 and 3-11, and segments 3-6 and 3-12 are respectively interconnected through corresponding lead wires. The numerals 4-1 and 4-2 indicate brushes which are adapted to receive current respectively from the positive and negative terminals, 5-1 and 5-2, of a DC supply source. In FIG. 2, the brushes 4-1 and 4-2 are angularly spaced from each other by 90°, corresponding to the case where m=1 and n=2 of the formula 360°/2mn (m being a positive integer of 1 or more, n being a positive integer of 2 or more), which equals the angular width of the field magnet pole. This is also equivalent to angularly spacing the brushes by 270° due to the interconnected commutator segments through the corresponding lead wires.

In the state shown in FIG. 2, current flows in the direction shown by arrows, and torque is generated at every armature winding to drive the armature in the direction of arrow A. Accordingly, the commutator 3 also rotates in the direction of arrow B, and, consequently, current circulates through the armature windings with its direction being changed by turns. In this embodiment of the DC motor, for one cycle of current circulation through every armature winding, the armature is rotated by 180°. To obtain 360° rotation of the armature, two cycles of current circulation through every armature winding are required. In this embodiment, the commutator segments 3-1, 3-2, ..., 3-12 are arranged in a manner that each pair of the segments which are 180° phase shifted are interconnected to permit the current to flow through every armature winding.

Figure 5A:
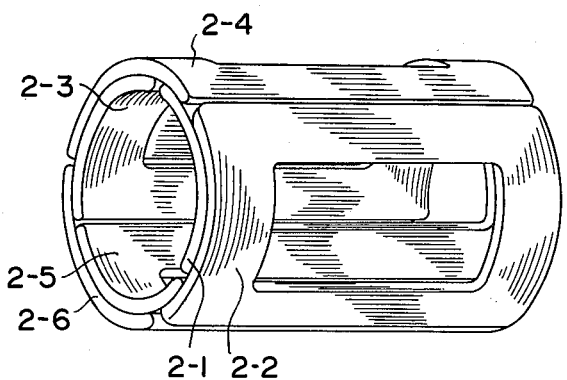
FIG. 5a is a perspective view of a cylindrical armature which is formed in accordance with the development of FIG. 2.
Figure 5B:
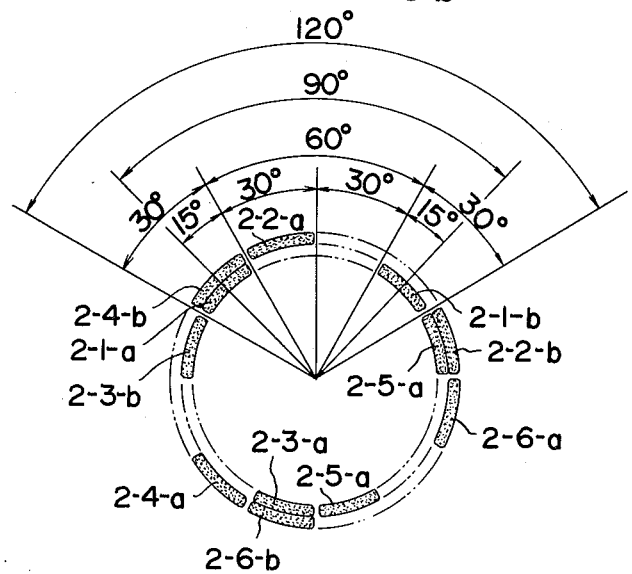

FIG. 5a is a perspective view of a cylindrical armature which is formed in accordance with the development shown in FIG. 2. FIG. 5b shows a cross section of the armature shown in FIG. 5a. In FIG. 5b, the numerals 2-1-a and 2-1-b indicate cross-sections of the conductor portions, which contribute to generate torque, of the armature winding 2-1. Similarly, the numerals 2-2-a, 2-2-b, 2-3-a, 2-3-b, 2-4-a, 2-4-b, 2-5-a, 2-5-b, and 2-6-a, 2-6-b indicate cross-sections of the conductor portions respective armature windings 2-2, 2-3, 2-4, 2-5, and 2-6. The first series of armature windings 2-1, 2-5, 2-3 are juxtaposed side by side and are located on along the inner side of the cylindrical armature. The angular spacing between the center radial lines of the conductor portions of each winding is 90° which is equal to the angular width of field magnet pole. The angular spacing between the radial lines at the outside ends of these conductor portions is 120°. These three armature windings are arranged contiguous to each other.

The second series of armature windings 2-2, 2-6, 2-4 are arranged in a similar manner to the first series of armature windings, and are located on and along the outer side of the cylindrical armature. The armature windings of the first series and the armature windings of the second series are superposed on each other with a 30° phase shift therebetween, thus forming a double-layer cylindrical armature. As will be noted from the above-described construction, the sections 2-1-a and 2-4-b, the sections 2-5-a and 2-2-b, and the sections 2-3-a and 2-6-b are superposed on each other in a perfectly coincident relationship, with the inner surface of one section facing to the outer surface of the other section. Thus, the armature windings can be easily disposed with respect to each other in an ideal positional relationship and, accordingly, undesirable out-of-phase between the windings can be perfectly avoided. Accordingly, by resin molding the armature windings into a cylindrical armature, a DC motor having a very high efficiency can be easily obtained. If jigs are utilized for positioning the armature windings, the jigs will be inserted into common vacant spaces between the inside and the outside groups of windings (30° angular space in this embodiment), to prevent undesirable out-of-phase between the windings.

Figure 6:
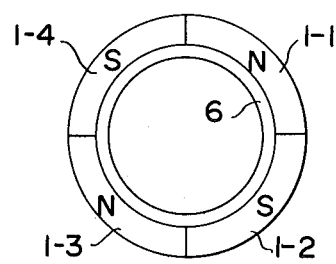
FIG. 6 is a cross-sectional view illustrating field magnet poles which are formed in accordance with the development of FIG. 2.

FIG. 6 is a cross sectional view of field magnet poles which are formed in a cylindrical assembly in accordance with the development shown in FIG. 2. Within this cylindrical magnet pole assembly is coaxially located the cylindrical armature of FIG. 5 with an air gap therebetween.

In FIG. 6, the cylindrical field magnet comprises the magnetic poles 1-1, 1-2, 1-3, 1-4, each having a 90° angular space, which are magnetized alternately to N and S polarities on the outer periphery in the radial direction. The numeral 6 indicates a cylindrical iron member which constitutes parts of the magnetic path provided by the magnetic poles 1-1, 1-2, 1-3, 1-4.

While the above-described embodiment of DC motor of the invention includes four field magnet poles and six armature windings, the objects of the invention can be accomplished also by another embodiment which employs six field magnet poles and ten armature windings. Such other embodiment will now be described.

First, reference will be made to a conventional lap winding DC motor which has two field magnet poles and ten armature windings which are phase shifted from each other, as shown in the development of FIG. 3. The numerals 1-1, 1-2 indicate field magnet poles which are magnetized respectively in N and S polarities at 180° angular spacing. The armature windings 2-1, 2-2, ..., 2-10 are provided with phase shifts of 36° therebetween. If the conventional winding technique is employed, these armature windings will be mounted on an armature so that the windings are superposed on each other in ten layers. The angular space of each of the armature windings 2-1, 2-2, ..., 2-10 is 180° which is equal to the angular width of each field magnet poles 1-1, 1-2. A commutator 3 consists of commutator segments 3-1, 3-2, ..., 3-10, each having a 36° angular space (1/5 of the angular width of the field magnet pole). The numerals 4-1, 4-2 indicate brushes which are adapted to receive current from the positive and negative terminals 5-1 and 5-2 of a DC supply source. The brushes 4-1 and 4-2 are angularly spaced from each other by 180° which is equal to the angular width of each field magnet pole.

The other embodiment of DC motor of the invention will now be described in conjunction with the development shown in FIG. 4. The numerals 1-1, 1-2, ..., 1-6 indicate field magnet poles which are magnetized alternately to N and S polarities in a 60° angular space. In case of the conventional lap winding DC motor, as shown in FIG. 3, under the field magnet poles 1-1, 1-2, which are magnetized in a 180° angular space, there are arranged all the armature windings 2-1, 2-2, ..., 2-10, each having an angular space which is equal to the angular width of the field magnet pole. Accordingly the armature windings must be superposed on each other in many layers. However, if six field magnet poles of a 60° angular space are employed and, as shown in FIG. 4 the armature windings 2-3, 2-4 are shifted rightward by 120°, the armature windings 2-5, 2-6 are shifted rightward by 240°, and the armature windings 2-9, 2-10 are shifted rightward by 120°, the windings will be under field magnet poles of the same polarity as in FIG. 3. The direction of output torque will accordingly not be changed from that in FIG. 3, and the DC motor will rotate in the same manner as the conventional lap winding motor. In the arrangement of FIG. 4, of course, the armature windings which would otherwise be located under the poles 1-3, 1-4, 1-5 are omitted. The angular spacing between conductor portions, which contribute to generate torque, of each of the armature windings 2-1, 2-2 ..., 2-10 is 60° which is equal to the angular width of the field magnet pole. A first series of armature windings 2-1, 2-7, 2-3, 2-9, 2-5 are juxtaposed side by side at equal pitches of 72°. Similarly, a second series of armature windings 2-2, 2-8, 2-4, 2-10, 2-6 are juxtaposed side by side at equal pitches of 72°. The first series of windings 2-1, 2-7, 2-3, 2-9, 2-5 and the second series of windings 2-2, 2-8, 2-4, 2-10, 2-6 are superposed on each other with a 12° phase shift therebetween. The order of interconnections of the armature windings in FIG. 4 is the same as in FIG. 3. That is, they are interconnected in the order of the windings 2-1, 2-2, ..., 2-10, the termination end of a preceeding winding being connected to the start end of the succeeding winding, and the interconnection junctures of the windings being connected to corresponding commutator segments as shown in FIG. 4.

A commutator 3 consists of commutator segments 3-1, 3-2, ..., 3-30, each having an angular space of 12° (1/5 of the angular width of the field magnet pole). Groups of the commutator segments consisting respectively of three segments 3-1, 3-11, 3-21, of three segments 3-2, 3-12, 3-22, of three segments 3-3, 3-13, 3-23, of three segments 3-4, 3-14, 3-24, of three segments 3-5, 3-15, 3-25, of three segments 3-6, 3-16, 3-26, of three segments 3-7, 3-17, 3-27, of three segments 3-8, 3-18, 3-28, of three segments 3-9, 3-19, 3-29, and of three segments 3-10, 3-20, 3-30 are respectively interconnected through their respective lead wires. The numerals 4-1 and 4-2 indicate brushes which are adapted to receive current respectively from the positive and negative terminals 5-1 and 5-2 of a DC supply source. In FIG. 4, the brushes 4-1 and 4-2 are angularly spaced from each other by 60°, corresponding to the case where m=1 and n=3 of the formula 360°/2mn (m being a positive integer of 1 or more, n being a positive integer of 2 or more), which equals the angular width of the field magnet pole. This is also equivalent to angularly spacing the brushes by 180° or 300° due to the interconnected commutator segments through the corresponding lead wires.

In the state shown in FIG. 4, current flows through the windings in the direction shown by arrows, and torque is generated at the respective armature windings to drive the armature in the direction of arrow A. Consequently, the commutator also rotates in the direction of arrow B, and accordingly, current circulates through the armature windings while changing in direction by turns. In this embodiment of the DC motor, for one cycle of current circulation, the armature rotates 120°. To obtain 360° rotation of the armature, three cycles of current circulation are required. It should be noted that each group of three commutator segments, which are 120° phase shifted from each other, are interconnected for circulation of current.

Figure 7A:
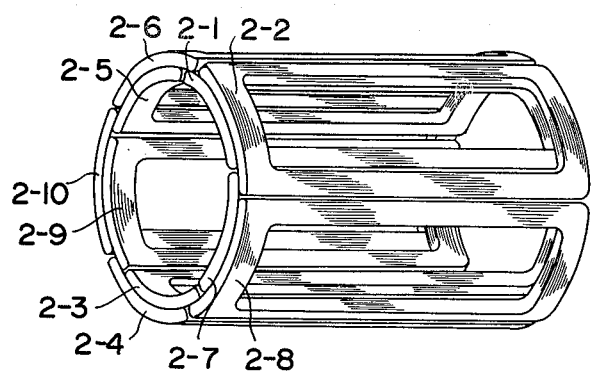
FIG. 7a is a perspective view of a cylindrical armature which is formed in accordance with the development of FIG. 4.
Figure 7B:
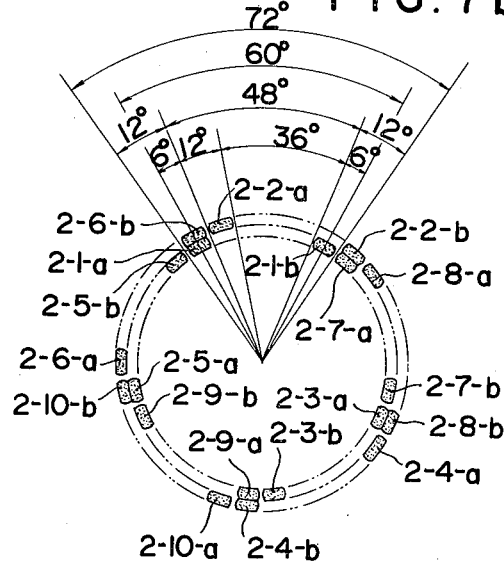

FIG. 7a is a perspective view of a cylindrical armature formed in accordance with the development of FIG. 4. FIG. 7b shows a cross section of the cylindrical armature of FIG. 7a. In FIG. 7b, the numerals 2-1-a and 2-1-b indicate cross-sections of the conductor portions, which contribute to generate torque, of the armature winding 2-1. Similarly, the numerals 2-2-a and 2-2-b, the numerals 2-3-a and 2-3-b, the numerals 2-4-a and 2-4-b, the numerals 2-5-a and 2-5-b, the numerals 2-6-a and 2-6-b, the numerals 2-7-a and 2-7-b, the numerals 2-8-a and 2-8-b, the numerals 2-9-a and 2-9-b, and the numerals 2-10-a and 2-10-b indicate cross-sections of conductor portions, of the respective armature windings 2-2, 2-3, 2-4, 2-5, 2-6, 2-7, 2-8, 2-9, and 2-10. A first series of armature windings 2-1, 2-7, 2-3, 2-9, 2-5 are juxtaposed side by side and are located on the inner side of the armature. The angular spacing between the radial center lines of the conductor portions, of each armature winding of the first series is 60°. The angular spacing between the radial lines at the outside ends of these conductor portions is 72°. The five armature windings of the first series are arranged contiguous to each other.

Similarly, a second series of armature windings 2-2, 2-8, 2-4, 2-10, 2-6 are juxtaposed side by side and are located on the outer side of the armature. The angular spacing between the radial center lines and the angular spacing between the radial lines at the outside ends of the conductor portions of each winding of this second series is respectively equal to those of the first series of the armature windings. The first series and the second series of armature windings, which are located on the outer side of armature, are superposed on each other with a 12° phase shift therebetween, thus forming a cylindrical armature. As will be noted from the above-described arrangement, each pair of the sections 2-1-a and 2-6-b, the sections 2-7-a and 2-2-b, the sections 2-3-a and 2-8-b, the sections 2-9-a and 2-4-b, and the sections 2-5-a and 2-10-a are superposed on each other in a perfectly coincident relationship, with the inner surface of one section facing to the outer surface of the other section. Thus, the armature windings can be easily disposed with respect to each other in an ideal positional relationship and, accordingly, undesirable out-of-phase between the windings can be perfectly avoided. Accordingly, by resin molding the armature windings into a cylindrical armature, a DC motor having a very high efficiency can be easily obtained. If jigs are utilized for angularly positioning the armature windings, the jigs will be inserted into common vacant spaces between the inside and the outside group of windings (36° angular space in this embodiment) to prevent undesirable out-of-phase between the windings.

Figure 8:
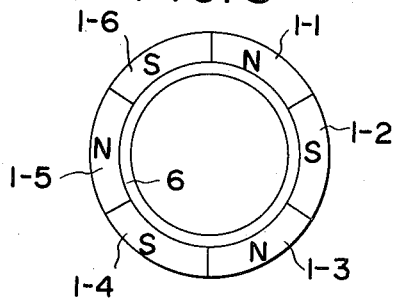
FIG. 8 is a cross-sectional view illustrating field magnet poles which are formed in accordance with the development of FIG. 4.

FIG. 8 shows a cross section of a cylindrical field magnet which is formed in accordance with the development shown in FIG. 4, wherein the cylindrical armature shown in FIG. 7 is coaxially located in this field magnet with an air gap therebetween. The field magnet shown in FIG. 8 comprises poles 1-1, 1-2, ..., 1-6 which each have a 60° angular space and are magnetized on the outer periphery, in the radial direction, alternately to N and S polarities. The numeral 6 indicates a cylindrical iron member which constitutes parts of the magnetic path produced by the field magnet poles 1-1, 1-2, ..., 1-6.

While the invention has been described in connection with a first exemplary embodiment, provided with four field magnet poles and six armature windings, and a second exemplary embodiment, provided with six field magnet poles and ten armature windings, the objects of the invention can be generally achieved by employing 2n field magnet poles (n being a positive integer of 2 or more) and a total of 2(2n−1) armature windings in each of the first and second series or, alternatively by employing (2mn) field magnet poles (m being a positive integer of 1 or more) and a total of [2m(2n−1)] armature windings in each of the first and second series, wherein all the armature windings are superposed on each other in two layers. Further, while, coreless armatures are employed and current is supplied to the armature windings by means of the commutators and the brushes, in each of the preferred embodiments of DC motors described above, the advantages of the present invention can be realized in disc-type motors, in core-type motors, and also in motors of the type wherein current is supplied to armature windings by means of semiconductor devices.

While the invention has been described in connection with the preferred embodiments, it is to be understood that various changes and modifications can be made without departing from the spirit and scope of the invention.

What is claimed is:

1. An improved direct current motor having an armature and armature windings for intersecting a magnetic path of a field magnet, said armature windings superposed on each other in double layers, wherein the improvement comprises:

a field magnet having 2 mn poles arranged peripherally at equal angular spacings and alternately magnetized to N and S polarities wherein m is a positive integer equal to or greater than 1 and n is a positive integer equal to or greater than 2;

a magnetic material for closing the magnetic path of said field magnet;

a first series of m(2n−1) armature windings mounted on said armature so that said windings are juxtaposed side-by-side at equal pitches, each said winding having conductor portions for generating torque which are angularly spaced from each other a distance equal to the angular width of each said field magnet pole;

a second series of $m(2n-1)$ armature windings mounted on said armature so that said windings of the second series are juxtaposed side-by-side at equal pitches, each said winding of the second series having conductor portions for generating torque which are angularly spaced from each other a distance equal to the angular width of each said field magnet pole, and the first series of $m(2n-1)$ armature windings and the second series of $m(2n-1)$ armature windings being interconnected and superposed on each other and having a phase shift with respect to each other equal to $1/(2n-1)$ of the angular width of each said field magnet pole.

2. A direct current motor according to claim 1 wherein terminals of said armature windings of said first and second series are connected respectively to corresponding ones of $2mn(2n-1)$ commutator segments, and $2mn(2n-1)$ commutator segments are interconnected in common mn by mn, further including brushes which are adapted to receive current from a positive and a negative terminals of a supply source and to slidingly contact with ones of said commutator segments, the angular spacing between said brushes being equal to the angular spacing between said ones of the commutator segments which is $360°/2mn$ or equal to the angular spacing between the commutator segments which are interconnected in common respectively with said ones of the commutator segments.

* * * * *